United States Patent
Adams et al.

(10) Patent No.: US 6,679,558 B2
(45) Date of Patent: Jan. 20, 2004

(54) INTEGRAL BLOW-MOLDED, STEEL REINFORCED AUTOMOTIVE SEATING STRUCTURE

(75) Inventors: Daryl Adams, Novi, MI (US); Keith Hensley, Farmington Hills, MI (US); Michael W. Moran, Highland, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/916,831

(22) Filed: Jul. 26, 2001

(65) Prior Publication Data

US 2003/0020319 A1 Jan. 30, 2003

(51) Int. Cl.[7] .................................................. A47C 7/02
(52) U.S. Cl. ............................ 297/452.65; 297/452.2; 297/DIG. 2
(58) Field of Search ...................... 297/452.18, 452.2, 297/452.65, DIG. 2, 451.13, 440.2, 440.22

(56) References Cited

U.S. PATENT DOCUMENTS

| | | | | |
|---|---|---|---|---|
| 3,054,643 A | * | 9/1962 | Militano | 297/440.2 |
| 3,245,715 A | * | 4/1966 | Gits | 297/59 |
| 4,152,023 A | * | 5/1979 | Buhk | 297/450.1 |
| 4,804,225 A | * | 2/1989 | Fourrey et al. | 297/452.2 |
| 4,892,355 A | * | 1/1990 | Fend | 297/440.22 |
| 5,253,924 A | | 10/1993 | Glance | |
| 5,375,914 A | * | 12/1994 | Donnelly | 297/335 |
| 5,437,498 A | * | 8/1995 | Waelde | 297/452.2 |
| 5,499,859 A | * | 3/1996 | Angell | 297/218.3 |
| 6,059,369 A | * | 5/2000 | Bateson et al. | 297/452.18 |
| 6,062,649 A | * | 5/2000 | Nagel et al. | 297/452.38 |
| 6,286,902 B1 | * | 9/2001 | Yoshimura | 297/452.18 |

FOREIGN PATENT DOCUMENTS

| | | | |
|---|---|---|---|
| DE | 197 28 052 A1 | 1/1999 | |
| FR | 2698832 A1 * | 6/1994 | B60N/2/44 |
| FR | 2 816 262 A1 | 5/2002 | |
| JP | 60024917 A | 2/1985 | |
| JP | 60024918 A | 2/1985 | |
| JP | 61114835 A | 6/1986 | |
| JP | 03047728 A | 2/1991 | |

* cited by examiner

Primary Examiner—Peter M. Cuomo
Assistant Examiner—Stephen D'Adamo
(74) Attorney, Agent, or Firm—Bill C. Panagos

(57) ABSTRACT

A method of manufacturing a seat back includes placing a steel support structure within a mold and blow-molding a hollow plastic body onto the steel support structure to form a seat back with the steel support structure integrally supported within the body. The steel support structure may be a hollow, U-shaped steel tube having first and second attachment features at distal ends thereof for attachment to a lower seat structure.

3 Claims, 2 Drawing Sheets

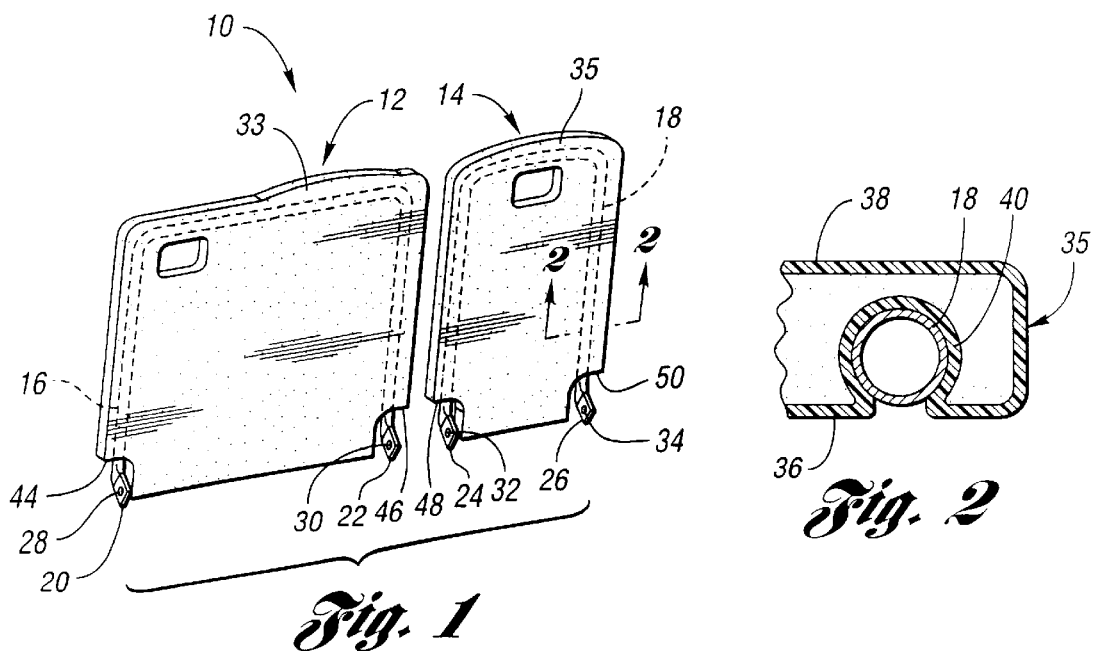
*Fig. 1*
*Fig. 2*
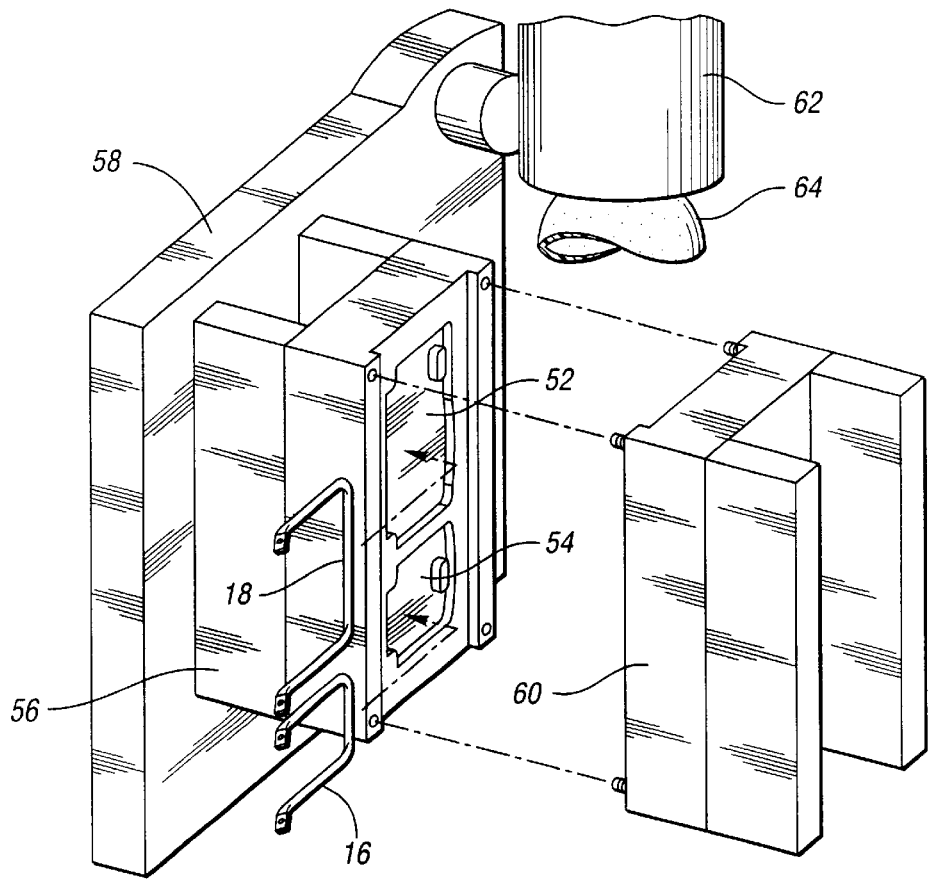
*Fig. 3*

INTEGRAL BLOW-MOLDED, STEEL REINFORCED AUTOMOTIVE SEATING STRUCTURE

BACKGROUND OF THE INVENTION

1. Field of the Invention

The present invention relates to a seating structure and a method of manufacturing a seating structure in which a steel support structure is placed within a mold and a plastic body is blow-molded against the steel support structure to form a seat back in which the steel structure is integrally supported in the body.

2. Background Art

In vehicle interior design, there exists a continuing need to reduce costs, part count and weight associated with vehicle seat assemblies while the vehicle seat assemblies are required to satisfy various design requirements, such as flexibility for improved cargo storage, comfort, safety, etc. In vans, minivans and sport utility vehicles, bench seats or split bench seats are often provided in the second and third row of the vehicle. These seats must be lightweight if they are collapsible or removable. Also, it is generally desirable to provide lightweight seats even if they are not removable. Due to increasing cargo transporting usage of such vehicles, it is important that these seats be designed to withstand significant impact from the rear as a result of forward movement of cargo stored in the rear of the vehicle.

It is desirable to provide a reinforced, lightweight and low cost seat assembly to satisfy impact requirements and provide the needed functionality while minimizing costs associated with the manufacture and assembly of the seat.

SUMMARY OF THE INVENTION

The present invention provides a seating apparatus in which a plastic body is blow-molded over the steel support structure to form a seat back wherein the steel support structure is integrally supported in the body.

The steel support structure is preferably a hollow, U-shaped steel tube having first and second attachment features at distal ends thereof. Alternatively, if the rear impact requirements were minimal, the steel support structure may comprise first and second independent partial frame supports configured for pivotal attachment to a lower seat. Of course, these designs may be tuned to provide the appropriate rear impact support.

In the preferred embodiment, the hollow, U-shaped steel tube would be swaged into a flat configuration at its distal ends, and the first and second attachment features would comprise boles drilled through the swaged ends. Preferably, the blow-molded plastic body would be a hollow structure with front and rear walls and would include C-shaped portions positioned around the steel support structure to rigidly attach the plastic body to the steel support structure.

Accordingly, an object of the invention is to provide an improved vehicle seat assembly with reduced manufacturing and assembly costs.

Another object of the invention is to provide an improved vehicle seat assembly in which a steel support structure is secured to a plastic base.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 1 shows a perspective view of a seat back assembly in accordance with the present invention;

FIG. 2 shows a cross-sectional view taken at line 2—2 of FIG. 1;

FIG. 3 shows a schematic exploded perspective view of an apparatus for blow-molding a seat back in accordance with the embodiment of FIG. 1.

DETAILED DESCRIPTION OF THE BEST MODES FOR CARRYING OUT THE INVENTION

Figure 4:
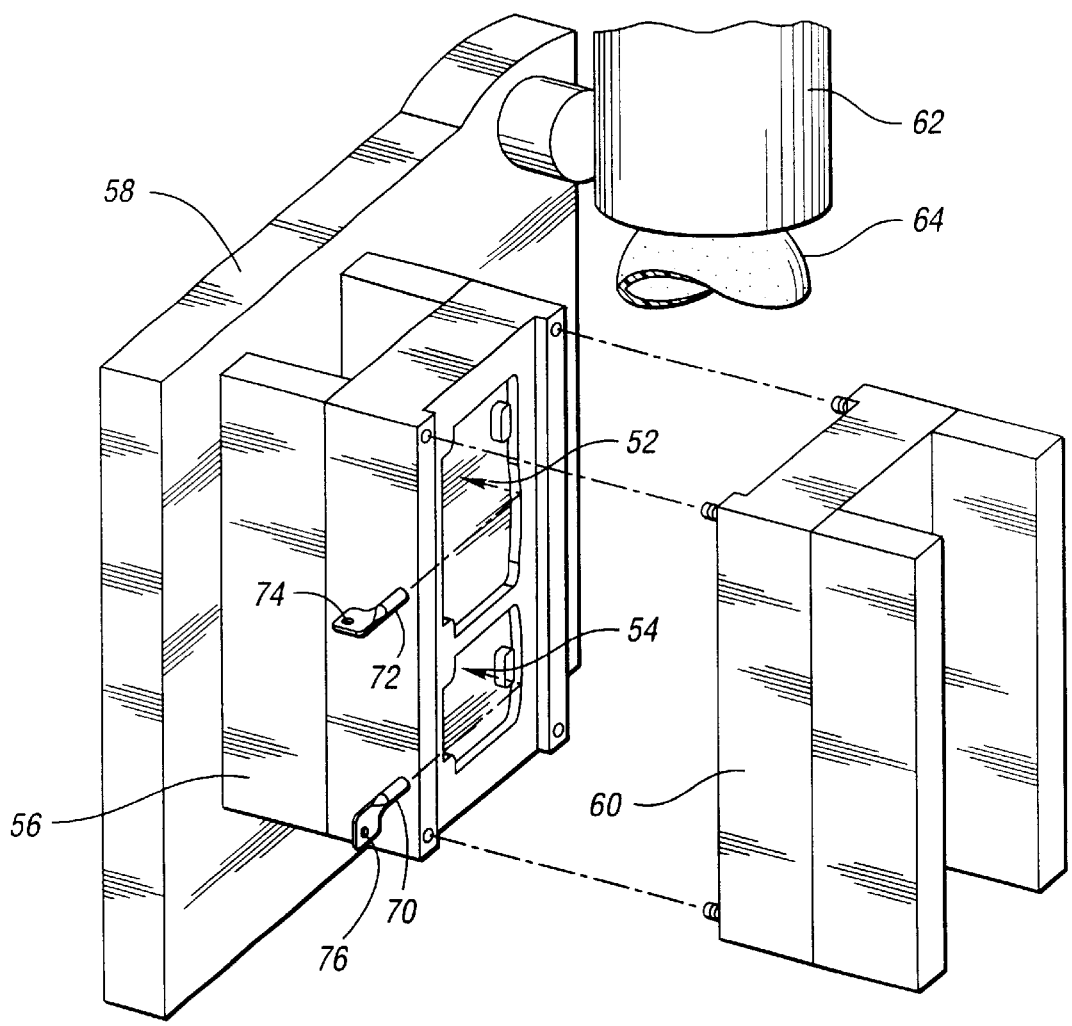
FIG. 4 shows a schematic exploded perspective view of an apparatus for blow-molding a seat back in accordance with an alternative embodiment of the invention.

Referring to FIGS. 1 and 2, a seat back assembly 10 is shown in accordance with the present invention. The seat back assembly shown is provided, for example, for use in a second row split-bench seat in a van. The seat back assembly includes a "60% portion" 12 and a "40% portion" 14. As shown, the 60% portion 12 and 40% portion 14 each include a hollow. U-shaped steel tube 16, 18, respectively. The steel tubes 16, 18 include swaged ends 20, 22, 24, 26 each having an attachment feature, such as a hole 28, 30, 32, 34, respectively. The attachment holes 28, 30, 32, 34 are configured to enable pivotal attachment to a lower seat.

The U-shaped steel tubes 16, 18 provide considerable impact strength for the seat back portions 12, 14.

As shown in cross-sectional view in FIG. 2, the plastic body 35 of the 40% portion 14 of the seat back 10 is a hollow, blow-molded structure including rear and front walls 36, 38, respectively. As shown, the plastic body 35 forms a C-shaped portion 40 which is molded over the hollow tube 18 and shrinks onto the tube 18 when cooled to form a secure attachment between the plastic body 35 and the tube 18.

Returning to FIG. 1, the plastic bodies 33, 35 of the 60% portion 12 and 40% portion 14 of the seat back assembly 10 each include cutout portions 44, 46, 48, 50 through which the distal ends of the U-shaped tubes 16, 18 protrude.

After molding, foam and fabric would be applied to the resulting seat back structures 12, 14.

Rather than using a hollow steel tube as described herein, a square tube, or other shaped structural steel members could be used. The steel structures are effective in transporting impact energy to the lower seating structure, especially those energies those generated by the headrest and rear intrusion impacts. This invention also addresses the need to reduce part numbers in these assemblies, reduce weight, reduce system costs, and reduce the potential for rattles in comparison with bolted structures.

While the best modes for carrying out the invention have been described in detail, those familiar with the art to which this invention relates will recognize various alternative designs and embodiments for practicing the invention within the scope of the appended claims.

What is claimed is:

1. A seat back comprising:

a hollow plastic body blow-molded into a generally rectangular shape, the plastic body having front and rear walls; and a steel support structure insert-molded within the plastic body to form the seat back, said steel support structure comprising a hollow U-shaped steel tube having first and second attachment features at distal ends thereof;

wherein said rear wall of the plastic body forms C-shaped portions around the steel support structure to rigidly attach the plastic body to the steel support structure.

2. The seat back of claim 1, wherein the distal ends of the steel support structure are each swaged into a flat configuration.

3. A seat back comprising:

a hollow plastic body blow-molded into a generally rectangular shape, the plastic body having front and rear walls; and a steel support structure insert-molded within the plastic body to form the seat back, wherein said steel support structure comprises first and second partial frame tubular supports having first and second attachment features at distal ends thereof for pivotal attachment to a lower seat;

wherein the rear wall of the plastic body forms C-shaped portions around the tubular supports of the steel support structure to rigidly attach the plastic body the steel support structure.

* * * * *